455-603 AU 233 EX
10/25/83 OR 4,412,356

United States Patent [19]

Klaus et al.

[11] 4,412,356
[45] Oct. 25, 1983

[54] LIGHT ACTUATED REMOTE CONTROL SECURITY SYSTEM

[75] Inventors: Jack C. Klaus; Larry D. Schroeder; Vincent H. Casteel; Kenneth E. Schwartz, all of Ames, Iowa

[73] Assignee: Iowa State University Research Foundation, Inc., Ames, Iowa

[21] Appl. No.: 112,125

[22] Filed: Jan. 14, 1980

[51] Int. Cl.[3] .......................... F05B 47/00; H04B 9/00; H04Q 1/00

[52] U.S. Cl. ................................ 455/603; 340/825.71; 70/DIG. 51

[58] Field of Search ................. 455/603; 340/171 PF, 340/63, 171 R, 572; 343/225; 70/DIG. 51, 277; 250/215; 361/162, 172

[56] References Cited

U.S. PATENT DOCUMENTS

| | | | |
|---|---|---|---|
| Re. 29,341 | 8/1977 | Peters et al. | 361/182 |
| 3,328,583 | 6/1967 | Davison | 455/619 |
| 3,733,861 | 5/1973 | Lester | 70/277 |
| 3,733,862 | 5/1973 | Killmeyer | 250/215 |
| 3,801,742 | 4/1974 | O'Brien | 340/171 PF |
| 3,845,362 | 10/1974 | Roe | 361/172 |
| 3,866,177 | 2/1975 | Kawamata et al. | 340/171 R |
| 3,879,709 | 4/1975 | Yukawa | 340/171 R |
| 3,891,980 | 6/1975 | Lewis et al. | 340/572 |
| 3,906,366 | 9/1975 | Minami et al. | 340/171 R |
| 4,143,368 | 3/1979 | Route et al. | 455/603 |
| 4,196,347 | 4/1980 | Hadley | 455/603 |

*Primary Examiner*—Robert L. Griffin
*Assistant Examiner*—Edward L. Coles
*Attorney, Agent, or Firm*—Zarley, McKee, Thomte, Voorhees & Sease

[57] ABSTRACT

A remote control security apparatus includes a lock element movable between locked and unlocked positions by an electrically actuated power device. The operator is provided with a portable transmitter adapted to generate light which is interrupted at a predetermined frequency so as to produce an encoded light signal. This signal is detected by a light transceiver which generates an independent signal at the same predetermined frequency and which compares the frequencies of the detected signal and independent signal. If these frequencies are substantially the same, the transceiver actuates the power means to move the lock element to its unlocked position. The security apparatus may be advantageously installed as a door lock, in which case a lock element receiving member is secured to the door. The signal detector is positioned at the exterior side of the door for receiving encoded signals from the transmitter and an override switch may be positioned at an interior side of the door for opening the lock without a transmitter. A contact switch is disclosed which maintains the lock element in the unlocked position whenever the door is open.

4 Claims, 7 Drawing Figures

LIGHT ACTUATED REMOTE CONTROL SECURITY SYSTEM

BACKGROUND OF THE INVENTION

The present invention relates generally to an improved lock which offers more convenience and security than conventional mechanical key locks, and more particularly to a remote control lock which is actuated by an encoded light signal generated by a small portable transmitter.

Conventional key-and-lock systems are installed for purposes of security yet almost all such locks are defeatable by some sort of crude or sophisticated lock picking technique. The tremendous increase in the number of robberies nationwide is at least some evidence of the lack of security afforded by the key-and-lock systems which have been in widespread use for many years.

Another problem of key-and-lock systems is the necessary inconvenience of their operation. The key must make actual contact with the lock and in fact be inserted into it and rotated in order to unlock the same. When carrying packages or the like, manipulation of a key in such manner can be very difficult.

Electronic locking devices have previously been proposed but these have generally been unsatisfactory for various reasons. One rather complicated device requires means for transmitting and receiving a plurality of strategically related radio frequency signals and another radio system requires a separate presence detector to be actuated in order for the transmitting and receiving system to be operable. Other devices have employed conventional keys modified to include strategically positioned openings through which light must pass in order for the key to operate the lock. These devices suffer from the same inconvenience associated with mechanical keys however. Finally, another known device uses radio frequency signals from a transponder to activate a transceiver to remove an abutment from the path of a door bolt. The bolt itself, however, must be manually moved by the door handle.

All of the above deficiencies are believed to be resolved by the improved security system of the present invention.

Accordingly, a primary object of the invention is to provide an improved remote control security system.

Another object is to provide an improved lock which is operated by remote control and thereby not defeatable by known lock picking techniques.

Another object is to provide an improved remote control lock including an opening device which is lightweight, unobtrusive and easy to carry.

Another object is to provide an improved remote control lock which is compatible with existing doors and power supplies.

Another object is to provide an improved remote control lock which is particularly suitable for small business and residential security use.

Another object is to provide an improved remote control lock which utilizes encoded visible light signals to effect operation thereof.

Another object is to provide an improved remote control lock wherein the opening device need not physically contact the lock structure when opening the same.

Finally, another object is to provide an improved remote control lock which is economical to manufacture, simple in construction and efficient in operation.

SUMMARY OF THE INVENTION

The light actuated remote control security system of the present invention includes a lock element such as an elongated bolt which is movable between locked and unlocked positions by an electrically actuated power means such as a solenoid. Authorized operators are provided with a portable transmitter adapted to generate light which is interrupted at a predetermined frequency so as to produce an encoded light signal. A light transceiver associated with the lock apparatus detects the encoded light signal and compares the frequency of the detected signal with an independent signal generated within the transceiver. If the frequencies are substantially the same, the solenoid or the like is actuated to move the lock element to its unlocked position. If the frequencies do not match, the solenoid is not actuated and the lock element remains in its locked position.

Accordingly, the security system of the present invention does not require that a key be fished out, inserted and twisted in the lock. Rather, all that is required is that the transmitter unit be pointed in the general direction of the door from short range and actuated by a push button or the like provided thereon. No separate presence detector is necessary and the lock-bolt element is automatically moved to its unlocked position by an electrically actuated power means. For added convenience, the electrical components of the present system are such that they may be incorporated in a very small, lightweight transmitter which can be easily carried in one's pocket, as opposed to less sophisticated prior devices such as garage door openers.

When installed as a door lock, a lock element receiving means is adapted to be secured to the door for receiving the lock element when the door is closed. An override switch may be provided on the interior side of the door for opening the lock from the inside without a transmitter. In addition, a contact switch may be installed between the door and frame for maintaining the lock element in an unlocked position when the door is opened so that the door may be closed without interference from the lock element. For security purposes, the system of the present invention is advantageous in that it is not defeatable by known lock picking techniques and very importantly, the door remains locked at all times whenever it is closed.

DESCRIPTION OF THE PREFERRED EMBODIMENT

Figure 1:
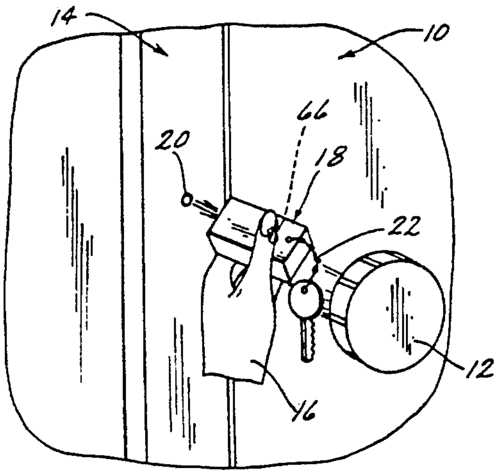
FIG. 1 is a partial perspective view showing a transmitter positioned exteriorly of a door for actuating the security system of the invention.

Referring to FIG. 1, a door 10 having a conventional door handle 12 is shown in a closed position within a door frame 14. Whereas only a portion of the door 10 and one side portion of the frame 14 are shown, it is understood that the opposite side of the door is pivotally connected to the opposite side portion of the frame for free swinging movement of the portion of the door that is shown.

An operator's hand 16 is shown holding a transmitter 18 of the security system of the present invention. The transmitter 18 directs light toward a small detector 20 which is mounted within the door frame and exposed to the exterior side thereof. Note that the transmitter 18 is small enough to be conveniently carried on a conventional key chain 22.

Figure 2:
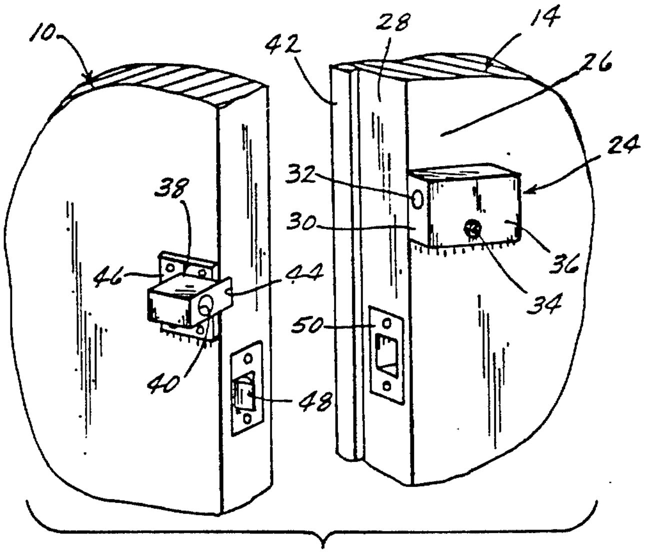
FIG. 2 is a perspective view of the interior side of a door and door frame equipped with the security system of the invention.

FIG. 2 shows the portions of the security system of the invention which are installed on the interior side of the door 10 and door frame 14. A box 24 is secured to the interior side 26 of door frame 14 adjacent the edge 28 thereof. One end wall 30 of box 24 has an opening 32 through which a lock bolt is axially slidable. A push button switch 34 protrudes outwardly through a removable cover plate 36 for unlocking the device from the inside without a transmitter, as further described hereinbelow.

A lock bolt receiving device 38 is secured to the interior face of the door 10 and includes a bore 40 positioned for alignment with the lock box opening 32 when the door 10 is closed against the door frame stop member 42. The lock bolt receiver may be mounted within a groove 44 and secured to the face of door 10 by a mounting flange 46. It can be seen in FIG. 2 that both the lock box 24 and lock bolt receiver 38 are positioned in axially spaced relation from the usual door latch 48 and keeper plate 50.

Figure 3:
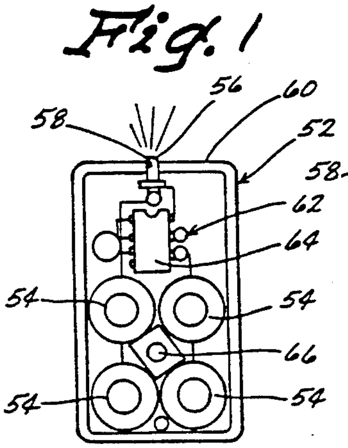
FIG. 3 is a top plan view of the transmitter with the top side removed to expose the electrical components therein.
Figure 4:
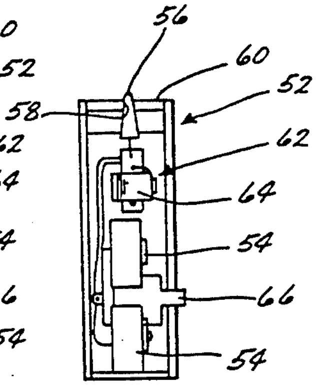
FIG. 4 is a side view of the transmitter of FIG. 3.

Transmitter 18 is shown in FIGS. 3 and 4 as comprising a housing 52 in which a plurality of batteries 54 are carried as the power source thereof. A light emitting diode 56 is mounted within an opening 58 through one end wall 60 for generating visible light signals. The light emitting diode (LED) 56 is electrically connected to the batteries 54 by a circuit indicated generally at 62 which includes an integrated circuit timer/oscillator chip 64 which is operative to cause the LED 56 to flash at a predetermined frequency whenever a push button switch 66 on the top side of the housing 52 is depressed by an operator.

Figure 5:
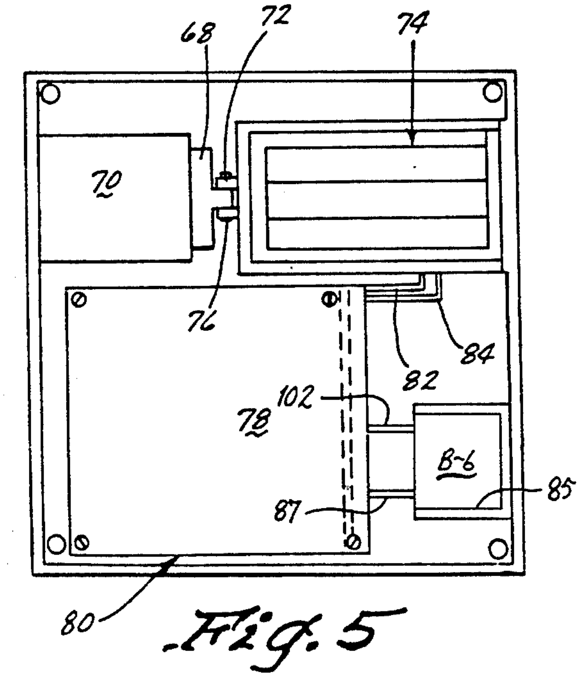
FIG. 5 is an enlarged front elevational view of the lock housing with the cover removed to expose the components therein.

The contents of lock box 24 are shown in FIG. 5. A lock bolt 68 is of a generally cylindrical shape and is axially slidable within a guide sleeve 70. Sleeve 70 may be formed of bronze and provided with a polyethylene inner sleeve coated with teflon grease for free sliding movement of the lock bolt 68. Aligned with the lock bolt 68 is the movable core 72 of an electrical solenoid 74 which is the power means for axially moving lock bolt 68. A pivot pin 76 interconnects the lock bolt 68 and solenoid core 72 for movement in unison. When solenoid 74 is actuated, the core is retracted into the body thereof to the position shown in FIG. 5. When electrical power to the solenoid is cut off, the core is biased to the left as seen in FIG. 5 thereby moving the lock bolt 68 from the retracted unlocked position shown to a locked position extended outwardly from a lock box end wall 30.

Lock box 24 also houses a circuit board 78 of a light signal transceiver indicated generally at 80. Solenoid 74 is electrically connected to the circuit board 78 by wires 82 and 84 for actuation by the transceiver. Whereas the transceiver is adapted for electrical connection to usual house current, a 6.1 V NICAD battery B-6 and holder 85 are supported within the lock box 24 and connected to circuit board 78 by wires 87 and 102 as a backup power supply in the event of a power failure.

Figure 6:
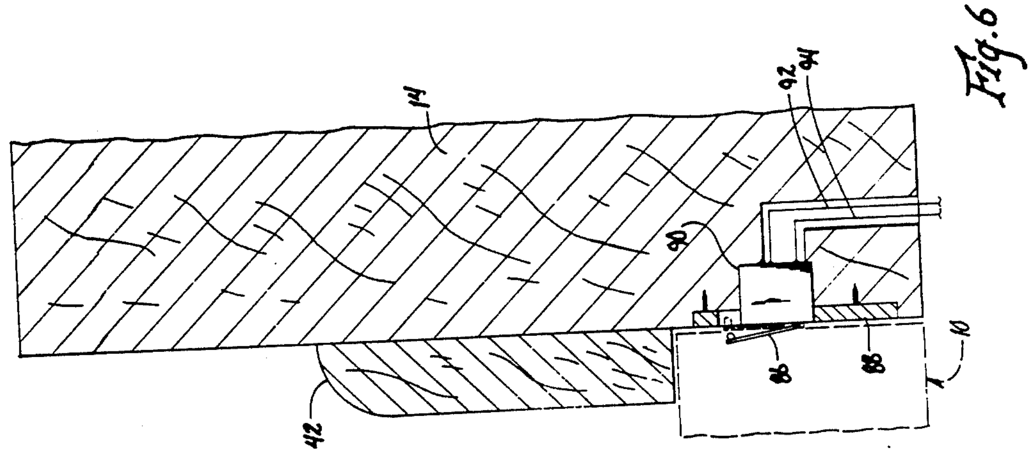
FIG. 6 is an enlarged detail top sectional view of a portion of a door frame equipped with a closure switch according to the invention.

Because the lock bolt 68 is biased to the extended or locked position at all times except when the solenoid 74 is actuated, it would interfere with closing of the door unless the solenoid were again actuated. To alleviate this problem, a contact lever switch 86 is shown in FIG. 6 on the edge 28 of door frame 14. Preferably, switch 86 together with its mounting plate 88 may be installed over a bolt cavity 90 which is generally provided for conventional mechanical type locks. Lead wires 92 and 94 connect switch 86 to the transceiver circuit board 78. Switch 86 is closed whenever the door 10 is opened, causing the lock bolt 68 to be retracted. When the door 10 is closed to the dotted line position indicated in FIG. 6, switch 86 is opened, lock bolt 68 is extended and the door is locked.

Figure 7:
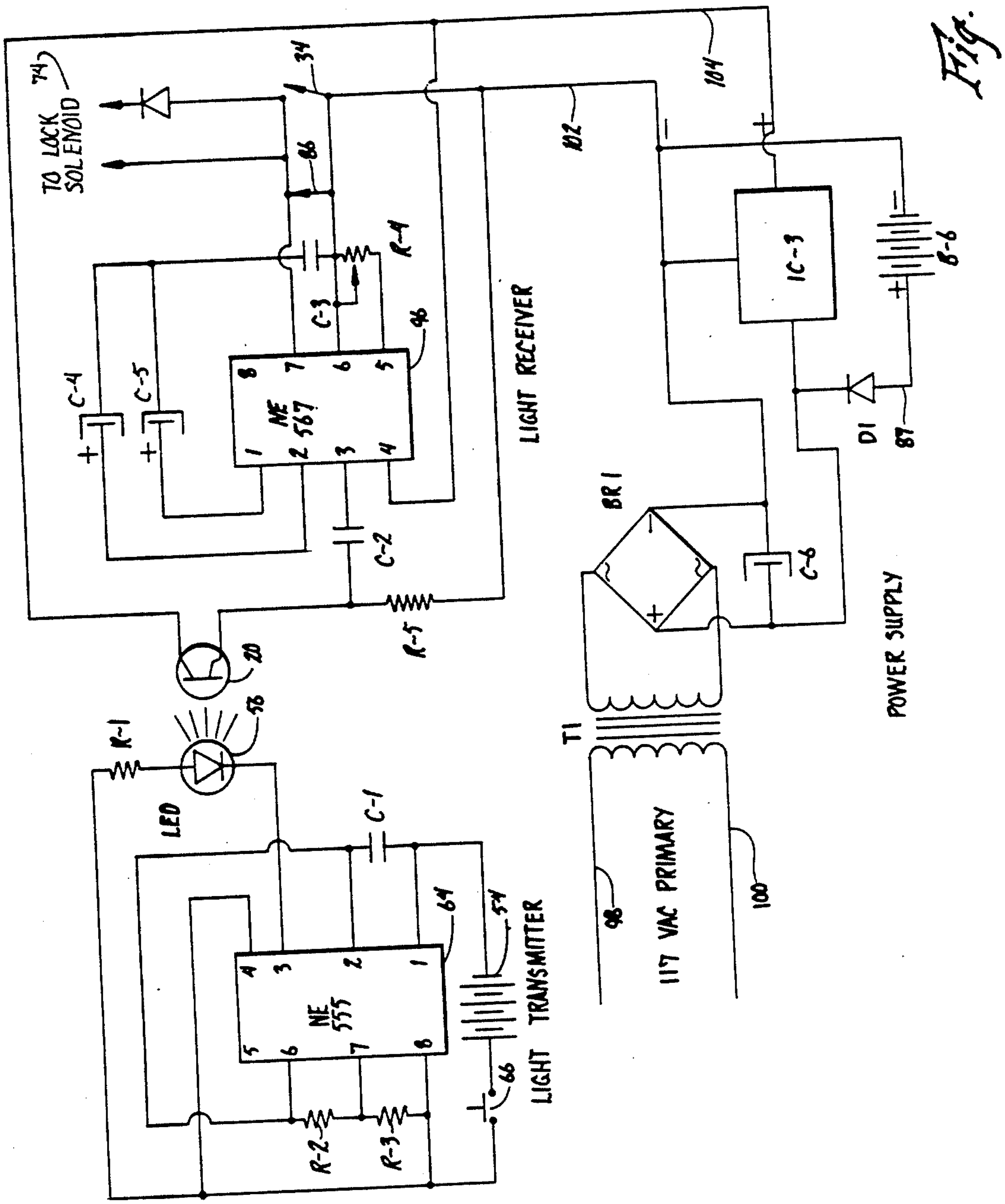
FIG. 7 is a schematic electrical circuit diagram for the security system of the invention.

The electrical circuit for the security system of the invention is shown in FIG. 7. The light transmitter 18 includes the light emitting diode 56 arranged in series with a resistor R-1 and electrically connected to a NE555 integrated circuit timer/oscillator chip 64 as shown. A capacitor C-1 and resistors R-2 and R-3 are also connected to chip 64 as shown. These are the frequency determining components of the transmitter. By varying the capacitance or resistance of these elements, the frequency of interruption of the LED can be precisely adjusted for a given installation. Finally, the push button switch 66 and batteries 54 are electrically connected across the chip 64 for activating the same whenever push button 66 is depressed.

The transmitter 18 produces an encoded light signal by utilizing light generated by the LED 56 which is modulated by the timer/oscillator chip 64. The timer/oscillator chip operates at a frequency determined by the following equation:

$$f_T = \frac{1.44}{C(R_A + 2R_B)}$$

where $R_A$, $R_B$, and C correspond to the frequency determining components R-2, R-3 and C-1 respectively, measured in ohms and farads respectively.

This signal of frequency $f_T$ drives the LED 56, which thus flickers at the rate $f_T$. The LED 56, being a solid-state device and thus having no filament, switches on and off with only an infinitesimal amount of lag.

The light detector 20 of transceiver 80 may be a FPT-100 phototransistor which produces electrical pulses at the same rate as the light pulses received ($f_T$). These pulses are coupled through a capacitor C-2 to the input of a NE567 integrated circuit chip 96, known as a phase locked loop (PLL). Essentially, the PLL's output turns "on" whenever a signal of frequency $f_R$ $1.1/R_1C_1$ is present at the input. Thus, if $f_R$ equals $f_T$, the output turns "on", driving the lock solenoid 74 to retract lock bolt 68.

Also electrically connected to the transceiver circuit are the push button switch 34 on the lock box 24 and the contact lever switch 86 operated by the door 10. The remaining circuit elements, which are connected as indicated, include capacitors C-3, C-4 and C-5 as well as variable resistor R-4 and resistor R-5.

Acceptable sizes for the various transmitter and transceiver components in one embodiment of the invention are as follows: C-1, 0.047 micro-farad, 1000 WVDC; C-2, 0.1 micro-farad, 1000 WVDC; C-3, 0.022 micro-farad, 1000 WVDC; C-4, 1.0 micro-farad, 100 WVDC; C-5, 2.2 micro-farad, 100 WVDC; R-1, 10 ohm, ¼ watt; R-2, 1K, ¼ watt; R-3, 10K, ¼ watt; R-4, 10K, ¼ watt; and R-5, 100K, ¼ watt.

The power supply for the transceiver 80 includes a 1 amp, 12 volt transformer, indicated at T1, connected by lines 98 and 100 to a 110 volt source of power. The output of transformer T1 is connected to a 1 amp, 50 PIV bridge rectifier indicated at BR1 which, in turn is connected through a voltage regulator IC-3 to lines 102 and 104 which provide a 6 volt direct current power supply to the transceiver 80. The backup batteries indicated at B-6 are connected in parallel with the voltage regulator IC-3 as indicated, for operation in the event of a power failure.

Installation of the security system of the invention entails mounting the lock box 24 on the interior side 26 of door frame 14 as indicated in FIG. 2, drilling approximately a ¼ inch diameter hole through the wall to the outside, and installing the light detector 20 in the hole so as to be exteriorly exposed as indicated in FIG. 1. The lock bolt receiver 38 is then mounted on the interior side of the door and aligned for receiving lock bolt 68. Finally, the contact lever switch 86 is installed on the edge 28 of the door frame 14 for actuation whenever the door is opened.

Operation of the security system begins with the transmitter 18. The operator need only position the transmitter 18 within short range of the light detector 20 and depress push button switch 66 to direct a beam of light toward the detector. The beam of light produced by the LED 56 is interrupted electronically by the timer/oscillator chip 64 at a rate determined by the three external components C-1, R-2 and R-3. The beam propagates through the air and strikes the detector 20 which sets up electric pulses at the same rate as the interruptions of the beam. The transceivers decoder chip 96 and its associated circuitry generates an independent signal at the same frequency of the transmitter which is designed to open it. If the frequency from the detected signal from light detector 20 is the same as the frequency of the independent signal of decoder chip 96, the output of chip 96 turns "on" and drives the locked solenoid 74 to retract lock bolt 68. This process is completed almost instantaneously. If a transmitter not designed for that particular lock is used, the frequencies will not match up and the lock solenoid 74 will not be actuated.

It is apparent that by varying the values of one or more of the frequency determining components of the transmitter 18 and transceiver 80, an infinite number of coded frequencies are possible. It is contemplated that the transmitter 18, which is constructed of inexpensive electrical components, could be provided either as a disposable item or as a permanent device equipped with rechargeable or replaceable batteries.

Thus there has been shown and described a light actuated remote control security system which accomplishes at least all of the stated objects.

We claim:

1. A remote control lock for a door having one side pivotally connected to one side portion of a door frame and an opposite free side closeable against an opposite side portion of the door frame, comprising, a lock housing supported on said opposite side portion of said door frame, a lock element supported on said housing for movement between a locked position wherein said element is advanced into the path of said door and an unlocked position wherein said element is retracted clear of the path of said door, a lock element receiving member secured to said opposite free side of said door at a position for receiving said lock element in the locked position thereof when said door is closed, thereby to lock said door in the closed position, bias means urging said lock element to said locked position, an electrically actuated power means supported by said housing for moving said lock element to said unlocked position against the urging of said bias means, a portable transmitter adapted to generate light which is interrupted at a continuously oscillating predetermined frequency, a signal receiving circuit supported by said housing and including means for detecting said encoded light signal and verification means for determining whether said encoded light signal is interrupted generally at said predetermined frequency, said verification means being electrically connected to said power means and operative to actuate said power means to move said lock element to said unlocked position when the frequency of the detected light signal substantially equals said predetermined frequency, said signal receiving circuit further comprising an override switch which is manually operable to actuate said power means to retrace said lock element.

2. A remote control lock for a door having one side pivotally connected to one side portion of a door frame and an opposite free side closeable against an opposite side portion of the door frame, comprising, a lock housing supported on said opposite side portion of said door frame, a lock element supported on said housing for movement between a locked position wherein said element is advanced into the path of said door and an unlocked position wherein said element is retracted clear of the path of said door, a lock element receiving member secured to said opposite free side of said door at a position for receiving said lock element in the locked position thereof when said door is closed, thereby to lock said door in the closed position, bias means urging said lock element to said locked position, an electrically actuated power means supported by said housing for moving said lock element to said unlocked position against the urging of said bias means, a portable transmitter adapted to generate light which is interrupted at a continuously oscillating predetermined frequency, a signal receiving circuit supported by said housing and including means for detecting said encoded light signal and verification means for determining whether said encoded light signal is interrupted generally at said predetermined frequency, said verification means being electrically connected to said power means and operative to actuate said power means to move said lock element to said unlocked position when the frequency of the detected light signal substantially equals said predetermined frequency, and a door actuated switch which is actuated in response to movement of said door from said closed position, said door actuated switch, when actuated, being operative to actuate said power means to retract said lock element to the unlocked position thereof.

3. A remote control security apparatus comprising, a support means, a lock element on said support means, said lock element being movable between a locked position and an unlocked position, electrically actuated power means for moving said lock element from said locked position to said unlocked position, a portable transmitter adapted to generate light which is interrupted at a continuously oscillating predetermined frequency thereby to produce an encoded light signal of pulses generated at substantially said predetermined frequency, a signal receiver circuit including means for detecting an encoded light signal, means for generating an independent signal generally at said continuously oscillating predetermined frequency and comparator means for comparing the frequencies of the detected signal and independent signal, said comparator means being electrically connected to said power means and operative to actuate said power means to move said lock element to said unlocked position when the frequencies of said detected and independent signals are substantially the same, said portable transmitter including a housing, an electrically actuated light source, a source of electrical power and circuit means for electrically connecting said source of electric power to said light source such that said light is interrupted at said continuously oscillating predetermined frequency, said circuit means comprising an integrated circuit timer/oscillator chip and a plurality of frequency determining components electrically connected thereto, and said means for generating an independent signal and said comparator means of said signal receiver circuit comprising an electronic phase locked loop and a plurality of frequency determining components electrically connected thereto, said signal receiver circuit further comprising an override switch which is manually operable to actuate said power means to retract said lock element to said unlocked position.

4. A remote control lock for a door having one side pivotally connected to one side portion of a door frame and an opposite free side closeable against an opposite side portion of the door frame, comprising, a lock housing, a lock element supported on said housing for movement between a locked position and an unlocked position, said lock housing adapted for support on the opposite side portion of a door frame so that said element, in the locked position thereof, is advanced into the path of the door and, in the unlocked position, is retracted clear of the path of said door, a lock element receiving member adapted for securement to said opposite free side of said door at a position for receiving said lock element in the locked position thereof when said door is closed, thereby to lock said door in the closed position, bias means urging said lock element to said locked position, an electrically actuated power means supported by said housing for moving said lock element to said unlocked position against the urging of said bias means, a portable transmitter adapted to generate light which is interrupted at a continuously oscillating predetermined frequency thereby to produce an encoded light signal of pulses generated at substantially said predetermined frequency, a signal receiving circuit supported by said housing and including means for detecting said encoded light signal and verification means for determining whether said encoded light signal is interrupted generally at said predetermined frequency, said verification means being electrically connected to said power means and operative to actuate said power means to move said lock element to said unlocked position when the frequency of the detected light signal substantially equals said predetermined frequency, and a door actuated switch adapted for support on a door frame and operative to be actuated in response to movement of the door from its closed position, said switch, when actuated, being operative to actuate said power means to retract said lock element to the unlocked position thereof.

* * * * *